United States Patent

Kosaka

[11] Patent Number: 5,099,521
[45] Date of Patent: Mar. 24, 1992

[54] CELL IMAGE PROCESSING METHOD AND APPARATUS THEREFOR

[75] Inventor: Tokihiro Kosaka, Hyogo, Japan

[73] Assignee: Toa Medical Electronics Co., Ltd., Kobe, Japan

[21] Appl. No.: 273,897

[22] Filed: Nov. 21, 1988

[30] Foreign Application Priority Data

Mar. 24, 1988 [JP] Japan .................................. 63-70775

[51] Int. Cl.$^5$ .............................................. G06K 9/00
[52] U.S. Cl. .......................................... 382/6; 382/21; 356/39; 364/413.08
[58] Field of Search ................. 382/6, 21; 364/413.08; 356/39; 128/653 R

[56] References Cited

U.S. PATENT DOCUMENTS 3,408,485 10/1968 Scott et al. ............................ 382/26
4,453,266 6/1984 Bacus ...................................... 382/6

Primary Examiner—David K. Moore
Assistant Examiner—Daniel Santos
Attorney, Agent, or Firm—Fitch, Even, Tabin & Flannery

[57] ABSTRACT

Cells are imaged, digitized and binarized pixel by pixel, after which cell identification codes for each of the cells in the image field are derived from information indicative of the edges of the cells. Various cell image parameters such as cumulative chromaticity information, chromaticity histograms, cumulative gradient information and gradient histograms relates to a large number of cells are calculated from the cell identification codes. These parameters make it possible to classify the cells.

24 Claims, 14 Drawing Sheets

Fig. 5

IMAGE PROCESSOR BOARD 20

CELL IMAGE PROCESSING METHOD AND APPARATUS THEREFOR

BACKGROUND OF THE INVENTION

This invention relates to a cell image processing system having a bus dedicated to image data. More particularly, the invention relates to a method and apparatus for processing cell images in which, even if a number of cells are captured in a single imaged frame, various cell image parameters regarding a number of cells, such as cumulative chromaticity information, chromaticity histograms, cumulative gradient information and gradient histograms, can be efficiently obtained in one frame cycle from edge detection information relating to the cells.

The general architecture of an image processing apparatus having a bus dedicated to image data, as well as the operation of this apparatus, will now be described in simple terms.

FIG. 1 is a block diagram illustrating an example of an image processing apparatus having a bus dedicated to image data.

The apparatus includes a general-purpose microcomputer 12 which functions as the overall host processor of the system, a plurality of slave boards for processing an image in hardware fashion, and a master controller and processor 14 for controlling the operation and function of the slave boards. More specifically, each board is operated by having its operating mode, function and parameters set by the master controller and processor 14 via a slave board control bus 16. The boards usually are interconnected via a six-to-nine channel bus 18 dedicated to image data, with an eight-bit bus serving as one channel.

The data on the dedicated bus flow in the manner of a time series identical with that of a raster scan system in television, and one-sixtieth of a second is required to deliver all of the data in a single image frame. In other words, the bus dedicated to the image data employs horizontal and vertical synchronization as the timing base, and random accessing for a single image frame of data cannot be performed via the data bus 18. Because the dedicated bus uses vertical synchronization as a timing base, the processing performed by the boards connected thereto also has the vertical synchronization cycle (one-sixtieth of a second) as a single processing cycle. Accordingly, the setting of the operating mode, function and parameters of the slave boards by the master controller and processor ordinarily is carried out during the vertical blanking period. The master controller and processor not only controls the slave boards in accordance with an image processing request from the general-purpose microcomputer but also functions to compute such characterizing parameters as the cell edge trace, cell image area and perimeter of the cell images based on data obtained through processing performed by an image processor board 20. Furthermore, it is also possible for the master controller and processor to randomly access the contents of image memory boards 22, 24 via the slave board control bus, ascertain the position at which a cell appears, read the image data pertaining solely to this portion and compute other characterizing parameters.

The general operation of the common image processing apparatus set forth above will now be described taking as an example a case in which a still picture of cells flowing in a planar sheath is captured and the cells are classified in accordance with type by means of image processing.

A planar sheath flow refers to a flow having a thickness the same as that of the thickest particle among the particles of interest and a width a number of times greater than that of the widest particle, e.g., a width which can be 100 times greater or more, wherein the flow is such that the particles of interest in the flow will not overlap one another in the direction of thickness. Examples of an apparatus in which a planar sheath flow is realized are disclosed in the specifications of Japanese Patent Publication No. 57-500995 and U.S. Pat. No. 4,338,024.

In order to acquire a still picture of cells in a planar sheath flow, strobe light or pulsed laser light having a short emission time is made to irradiate the flow from the thickness direction thereof, and an image is formed on the image pickup surface of a video camera (color camera) via an objective lens. The camera outputs analog signals resolved into the three colors R (red), G (green) and B (blue). These are fed into an image input board 28 which subjects them to an analog/digital (A/D) conversion. The resulting digital R, G and B data is stored in an image memory board 22 via a three-channel image data bus. At the same time, the data is inputted also to the image processor board 20, which executes preprocessing for determining whether a cell is in view and for detecting the edge of the cell. Preprocessing entails extracting an average value of, e.g., G (green) and B (blue) data at each point (pixel) of an image and forming a histogram of the entire image frame in realtime. The data processed by the image processor board 20 is stored in the image memory board 24 via the dedicated bus 18. Though the method in which the two image memory boards 22, 24 are used is not particularly limited, in the present description the image memory board 22 shall be used to store original image data and the image memory board 24 shall be employed to store data which has been processed.

In one vertical blanking period the master controller and processor 14 checks the histogram prepared in the image processor board 20 and determines whether a cell is present in a single imaged frame. If it is decided that no cell is present, then the program of the master controller and processor 14 returns to processing for the next imaged frame. When a cell is found to exist, the program proceeds to the next image processing step. An example of the next image processing step would by processing for subtracting previously stored background data from the imaged data, preparing a histogram from the results obtained, binarizing the image data as preprocessing for the purpose of tracing the edge of a cell, and detecting the cell edge. The resulting edge detection data is stored in the image memory board via the bus dedicated to image data. By way of example, edge detection information might include eight-bit data made to correspond to each pixel of a single image frame, in which pixels that take on value other than 0 are regarded as cell edge points and the direction in which the next neighboring cell edge point is located is indicated by the particular value. When this processing is completed, the master controller and processor 14 refers to the edge detection information in the image memory board via the slave board control bus 16, and the edge of each and every cell is traced by means of a microprogram. At the same time, computations for the area and perimeter of each cell, cumulative chromaticity information and shape parameters are performed. Each cell is then classified based on the characterizing parameters obtained.

In a system in which it is required to save (store) images of the cells observed, processing is necessary in which the position occupied by each cell in the frame is determined from the results of edge tracing for each cell, partial regions of the original frame in which cells are present are extracted, and the regions are gathered together in accordance with each cell class and saved in memory. The cell image data saved in accordance with each class is inputted to a display processor board 30 via the dedicated bus 18 and is displayed on a color monitor 32. This completes the brief description of image processing performed by an image processing apparatus having a bus dedicated to image data.

A problem which the present invention attempts to solve concerns processing for obtaining, in a highly efficient manner, cell image parameters which are valuable characterizing parameters of each cell image, namely cumulative chromaticity information, chromaticity histograms and cumulative gradient information, which represents the complexity of cell interior, for each of the three colors R, G and B.

Let the image data indicative of cell interior be represented by R(i,j), G(i,j) and B(i,j) for these three colors. Cumulative chromaticity information in each of these colors within a cell will then be expressed by $$\Sigma R(i,j), \Sigma G(i,j), \Sigma B(i,j)$$

respectively.

As shown in FIG. 9, a chromaticity histogram is a graph in which the chromaticity of each pixel of a cell interior is plotted along the horizontal axis and the number of pixels (frequency) having this chromaticity value is plotted along the vertical axis.

Cumulative chromaticity information and the chromaticity histogram can be extremely important in cases where cells are capable of being dyed in different colors using certain suitable dyeing solutions in order to identify and classify the cells.

A conventional method of obtaining the aforementioned cell image parameters in an image processing apparatus having a bus dedicated to image data will now be described.

Prior-Art Method I

Upon determining an area in which cell images are present by tracing the edges of the cells, the master controller and processor 14 accesses the image memory storing the original imaged frame via the slave board control bus 16, reads in the image data indicative of cell interior one or two pixels at a time, computes cumulative chromaticity information and prepares chromaticity histograms. These processing steps will now be described with reference to FIG. 10.

(1) Memory addresses storing the pixel data for each single pixel of a cell image are set for the original image memory via the slave board control bus 16. In other words, memory addresses are set in a register within the image memory board 22.

(2) This pixel data is read out to the slave board control bus 16 and the data is accepted by the master controller and processor 14.

(3) Cumulative chromaticity information is updated by adding up the accepted data, and the chromaticity histogram is updated by incrementing the frequency value corresponding to the value of the data.

By repeatedly executing the steps (1) through (3) for each color (red, green and blue), cumulative chromaticity information and chromaticity histograms for the entire cell image are obtained. All of this processing is executed in accordance with a microprogram within the master controller and processor 14.

If the object of processing is not original image data but image gradient data computed in accordance with the Sobel formula for obtaining an image gradient, cumulative gradient information and gradient histograms representing cell interior complexity are obtained.

This processing system is disadvantageous in that considerable time is needed for the master controller and processor to access the image memories. Several micro-seconds are required for one to two pixels of data to be processed in steps (1) through (3) described above. If the number of pixels in a cell image is 2000 and the processing of steps (1) through (3) requires 3 $\mu$m, by way of example, then 18 ms (milliseconds) will be needed in order to obtain three-color cumulative chromaticity information and chromaticity histograms of the cell image. This length of time is greater than a vertical synchronizing cycle of 16.7 ms. This means that realtime processing for an imaged picture that changes every one-sixtieth of a second is impossible. Though processing within one-sixtieth of a second if possible if the number of pixels of a cell image is 1000, before such processing is performed it is necessary for the master controller and processor to execute edge tracing of cell images based on the edge detection information and accurately obtain the range within which cell images reside; hence, the time needed for this processing must also be taken into consideration. Furthermore, if there are a large number of cells preser t in a single imaged frame, the time needed for processing increases in proportional to the number of cells.

Another disadvantage of the foregoing system is that a greater load is placed upon the master controller and processor. The limitation on the processing capability of the master controller and processor limits the processing capability of the entire image processing system, so that the provision of the bus dedicated to image data loses its meaning. Originally, the advantage of the dedicated bus is to make possible greater diversification of processing, parallel processing and pipeline operation by allowing several processor boards and image memory boards to be connected to the bus when necessary, thereby making realtime processing feasible even with regard to an image that changes every one-sixtieth of a second.

Prior-Art Method II

This method is implemented by providing a cumulative adder and a histogram forming circuit within the image processor boards connected to the bus dedicated to image data. Processing for obtaining cumulative chromaticity information and processing for obtaining chromaticity histograms will be described separately hereinbelow.

Cumulative chromaticity information is obtained by the following processing steps, which will be described with reference to FIG. 11:

(1) Original image data stored in the image memory is fed into a cumulative adder 34 in the image processor board 20 via the dedicated bus 18.

(2) The master controller and processor 14 resets the cumulative adder 34 every horizontal blanking period. Cumulative chromaticity data for each pixel where the left edge of the image frame is 0 is thus computed for every horizontal line of the image. Let Cl(i,j) represent the chromaticity data of each pixel, and let Cμ(i,j) represent the cumulative chromaticity data corresponding to each pixel. We will then have $$C\mu(i,j) = \sum_{i=1}^{i} Cl(i,j) \quad (1)$$

(3) The cumulative chromaticity data corresponding to each pixel computed by the cumulative adder 34 is stored in the image memory via the dedicated bus 18.

The processing steps (1) through (3) are executed in parallel though there is a time lag involved, and processing for one imaged frame is completed in one-sixtieth of a second. However, in order to obtain the cumulative chromaticity data for each of the colors R (red), G (green) and B (blue), it is required that the foregoing processing be repeated three times, so that the length of time required is three times one-sixtieth of a second.

(4) The master controller and processor 14 performs an edge trace of each cell based on the edge detection information obtained by the image processor board 20 and, at the same time, reads the cumulative chromaticity data corresponding to the particular edge point out of the image memory via the slave board control bus 16.

(5) The master controller and processor 14 computes cumulative chromaticity information relating solely to the cell portions from the cumulative chromaticity data of the edge points.

The computation involved in step (5) will now be described.

If the edge points of a cell are as shown in FIG. 12, cumulative chromaticity information $C_{\mu j}$ corresponding solely to a j-th line within the cell image will be expressed as follows:

$$C_{\mu j} = \sum_{i=l_j}^{r_j} Cl(i,j)$$
$$= \sum_{i=1}^{r_j} Cl(i,j) - \sum_{i=1}^{l_j} Cl(i,j)$$

From Eq. (1) we have $$C_{\mu j} = C_\mu(r_j,j) - C_\mu(l_j,j)$$

Cumulative chromaticity information $C_\mu$ for the entire cell is found in accordance with the following equation from the $C_{\mu j}$ of each line:

$$C_\mu = \sum_{j=n}^{n+h} C_{\mu j}$$

The foregoing computation is repeated three times in order to obtain cumulative chromaticity information for each of the three colors.

This method of obtaining cumulative chromaticity information has a number of drawbacks. First, it is necessary that the computed cumulative chromaticity data $C_\mu(i,j)$ corresponding to each pixel be stored in advance by the time the master controller and processor performs edge trace processing. This means that extra memory capacity is required. Second, if only one cumulative adder is provided in the image processor board, three vertical synchronizing cycles will be required to compute the cumulative chromatically data for each of the colors R, G and B in advance. This means that realtime processing of an imaged frame every one-sixtieth of a second will not be possible. If three image processor boards are used, realtime processing will become feasible but at a corresponding higher cost.

Obtaining a chromaticity histogram in accordance with the Prior Art Method II will now be described. This method is implemented by providing a histogram forming circuit and a window function within the image processor board. As shown in FIG. 13, a window of this kind refers to a time region having horizontal and vertical synchronizing signals as the timing base. A window function is one in which, of the data on the dedicated bus, only data in the window period is taken as the object of processing. The processing steps involved in this method will be described with reference to FIG. 14.

(1) Upon determining an area in which cell images are present by tracing the edges of the cells, the master controller and processor 14 sets a parameter, which is for designating a rectangular window corresponding to this area, in a window setting register within the image processor board 20 via the slave board control bus 16. Also, with regard to issuance of a command to clear the memory for storing the histogram in advance, and as to which address (page) of the memory is to store the histogram, the setting is made beforehand in similar fashion in the vertical blanking period via the slave board control bus.

(2) The original imaged frame data stored in the image memory board 22 is outputted to the dedicated bus 18.

(3) The data solely in the period designated by the window is picked up by the image processor board which then proceeds to prepare a histogram of the data.

If only one histogram forming circuit is provided in the board, it will be required to repeat the aforementioned steps (2) and (3) three times in order to prepare a chromaticity histogram for each of the three colors. Furthermore, if only one window function is provided and there are two or more cells present in the single imaged frame, then it will be necessary to repeat the above-described processing a corresponding number of times. In such case the time needed would be 16.7 (ms)×3(colors)×the number of cell images.

(4) When a chromaticity histogram has been prepared within the image processor board by the processing of steps (1) through (3), the master controller and processor reads out the contents of the histogram via the slave board control bus.

(5) The histogram prepared by the image processor board is a histogram of the type shown in FIG. 16(a), which includes an image of the background surrounding the cell portion in addition to the cell portion itself. A chromaticity histogram of the cell image alone, as shown in FIG. 16(b), is obtained by eliminating the portion corresponding to the background.

This method of obtaining cumulative chromaticity information also has a number of drawbacks. First, if the image processor board is equipped with only one window function and only one histogram forming circuit, as mentioned above, three vertical synchronizing cycles will be needed to obtain a chromaticity histogram for each of the three colors. If two or more cells are present in a single imaged frame, a correspondingly greater amount of time is required and realtime processing of the imaged frame every one-sixtieth of a second becomes impossible.

Another disadvantage is that the histogram prepared by the image processor board contains not only the cell image portion (the portion A in FIG. 16) but also the background portion around the cell image. Depending upon the type of cell or the type of dyeing solution, the interior part of the cell has almost the same color as the cell background, in which case the histogram of the background portion (the portion B in FIG. 16) and the histogram of the cell portion (the portion A in FIG. 16) overlap each other, thereby making it difficult to obtain an accurate histogram of the cell portion alone.

SUMMARY OF THE INVENTION

An object of the present invention is to solve the foregoing problems involved in the above-described conventional methods of obtaining the cell image parameters such as the cumulative chromaticity information, chromaticity histograms and cumulative gradients of each cell, thereby making it possible to realize, at low cost, realtime processing of an imaged frame that changes every one-sixtieth of a second, and to obtain accurate histograms solely of the cell image portions.

According to the present invention, the foregoing object is attained by providing a cell image processing method comprising the steps of capturing a cell image by image pickup means, storing the captured image data as an original image data, binarizing the image data upon indentifying a background portion and cell image portions contained in the original image data, deriving cell edge detection information for each pixel from the binarized image data, tracing cell edges, in order to obtain edge points of the cells, by referring to the edge detection information, and deriving various cell image parameters by referring results of edge tracing, characterized by deriving cell identification codes when the edge tracing is performed, the cell identification codes identifying each edge point to indicate which edge point belongs to which cell and indicating which side of the edge point is exterior to the cell, the aforementioned cell image parameters being derived by successively reading out the original image data and the cell identification codes upon correlating them with each pixel.

The above-described method further includes a step of deriving a processed image data by subjecting the original image data to processing for making cell features more conspicuous, in which case the processed image data may be employed instead of the original image data as the image data which is to object of the above-described image processing.

In accordance with the cell image processing method of the invention, the step of deriving the cell image parameters includes the steps of adopting the original image data or the processed image data as the image data which is the object of image processing, and determining from the cell identification codes whether each pixel of the image data which is the object of image processing is an edge on a starting-point side of a cell as seen in a pixel-by-pixel scanning direction, latching a cell number read from the cell identification codes when it is determined that the pixel is an edge on the starting-point side, totalizing image data of each pixel cell number by cell number, determining from the identification codes whether each pixel of the image data which is the object of image processing is an edge on an end-point side of a cell as seen in a pixel-by-pixel scanning direction, unlatching the cell number when it is determined that the pixel is an edge on the end-point side, and determining whether processing of all pixels has ended.

In accordance with the present invention, the foregoing object is attained by providing a cell image processing apparatus employing a method of capturing a cell image data by image pickup means, storing the captured image data as an original image data, adopting the original image data, or a processed image data obtained by subjecting the original image data to processing for making cell features more conspicuous, as an image data which is the object of image processing, binarizing the image data upon identifying a background portion and cell image portions contained in the original image data, deriving cell edge detection information for each pixel from the binarized image data, tracing cell edges, in order to obtain edge points of the cells, by referring to the edge detection information, and deriving various cell image parameters by referring to results of edge tracing, the apparatus comprising means for deriving cell identification codes identifying each of the edge points to indicate which edge point of the image data which is the object of image processing belongs to which cell and indicating which side of the edge point if exterior to the cell, means for successively reading out the image data which is the object of image processing and cell identification codes upon correlating them with each pixel, means for reading a cell number from the cell identification codes, means for determining from the cell identification codes whether each pixel of the image data which is the object of image processing is an edge on a starting-point side of a cell as seen in a pixel-by-pixel scanning direction; means for latching the cell number when it is determined that the pixel is an edge on the starting-point side; means for totalizing image data of each pixel cell number by cell number; means for determining from the identification codes whether each pixel of the image data which is the object of image processing is an edge on an end-point side of a cell as seen in a pixel-by-pixel scanning direction; means for unlatching the cell number when it is determined that the pixel is an edge on the end-point side; and means for determining whether processing of all pixels has ended.

In accordance with the cell image processing method and apparatus of the invention, a characterizing cell identification code is derived during edge tracing. The cell indentification code identifies which edge point of the image data which is the object of processing belongs to which cell and indicates which side of the edge point is exterior to the cell. The cell identification code is used when deriving the cell image parameters. It is determined from the cell identification code whether each pixel of the image data which is the object of image processing is an edge on a starting-point side of a cell as seen in a pixel-by-pixel scanning direction. When it is determined that the pixel is an edge on the starting-point side, a cell number read from the cell identification code is latched, and the image data of each pixel is totalized cell number by cell number. It is determined from the cell identification code whether each pixel of the image data which is the object of image processing is an edge on an end-point side of a cell as seen in a pixel-by-pixel scanning direction. When it is determined that the pixel is and edge on the end-point side, the cell number is unlatched.

Even if a plurality of cells are present in a single image frame, the foregoing method makes it possible to obtain the cell image parameters by specifying a cell number for each cell.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4 and 5 are explanatory views illustrating examples in which the edge points of a cell are encoded by cell identification codes;

DESCRIPTION OF THE PREFERRED EMBODIMENT

A method and apparatus for cell image processing in accordance with the present invention will now be described in detail with reference to the drawings.

Figure 2:
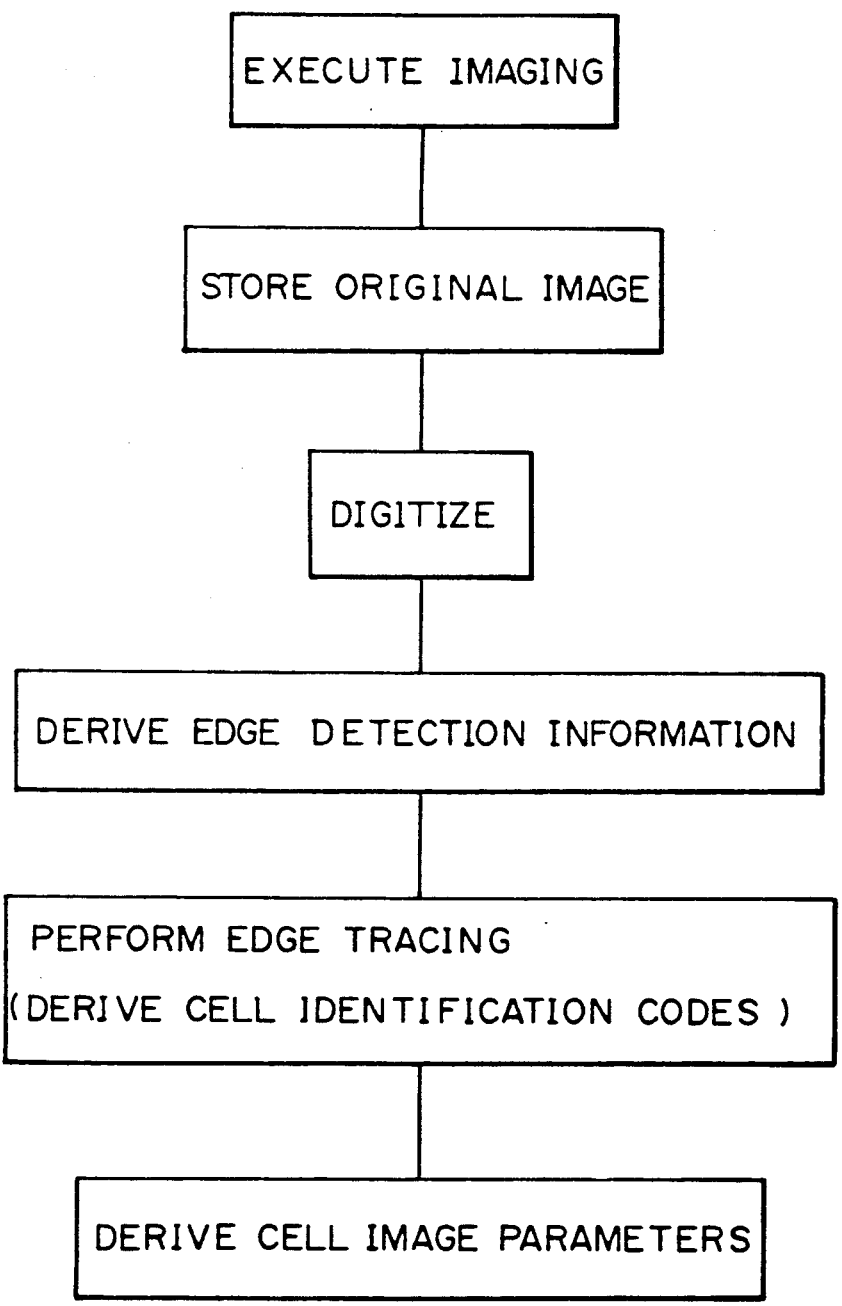
FIG. 2 is a flowchart illustrating the overall flow of the cell image processing method of the present invention.

FIG. 2 is simple flowchart illustrating the overall flow of the cell image processing method of the invention.

An image captured by the video camera (a color camera and image pick-up device) 26 is stored in the image memory board 22 as an original image. In order to extract cell images contained in the original image, processing for binarizing the image is executed by the image processor board 20 in such a manner that background takes on a value of logical "0" while portions occupied by cell images take on a value of logical "1". Within the image processor board 20 the binarized data typically is gathered into a 3×3 pixel array of three pixels from left to right in the scanning direction and three pixels from top to bottom, this data is inputted to an edge detector within the board to compute edge detection information for each and every pixel, and the information is outputted to the image memory board 24. Though the edge detection information is of a type well known to those skilled in the art as mentioned in the description of the prior art, this information will be described in further detail later. The image processor board 20 counts how many edge points there are on each horizontal line in one frame and is capable of storing this value in realtime. The edge count value is necessary when performing edge tracing if there are a large number of cells in a single picture. More specifically, whenever one point of an edge is traced in point-to-point edge tracing, the edge count value of the horizontal line corresponding to this edge is decremented. When tracing of the edge points of all cells in a single frame image is thus completed, all of the counted values become zero. If all of the counted values are not zero, this means that the edges of other cells are present.

When the foregoing processing is completed, the master controller and processor 14 performs cell edge tracing, and prepares a chain code of the edge of each cell, while referring to the edge detection information stored in the image memory and the information indicative of the number of edge points per horizontal line stored in the image processor board. The chain code is a code well-known to those skilled in the art and it is from this code that the perimeter, area and shape parameter of each cell are obtained.

Figure 3:
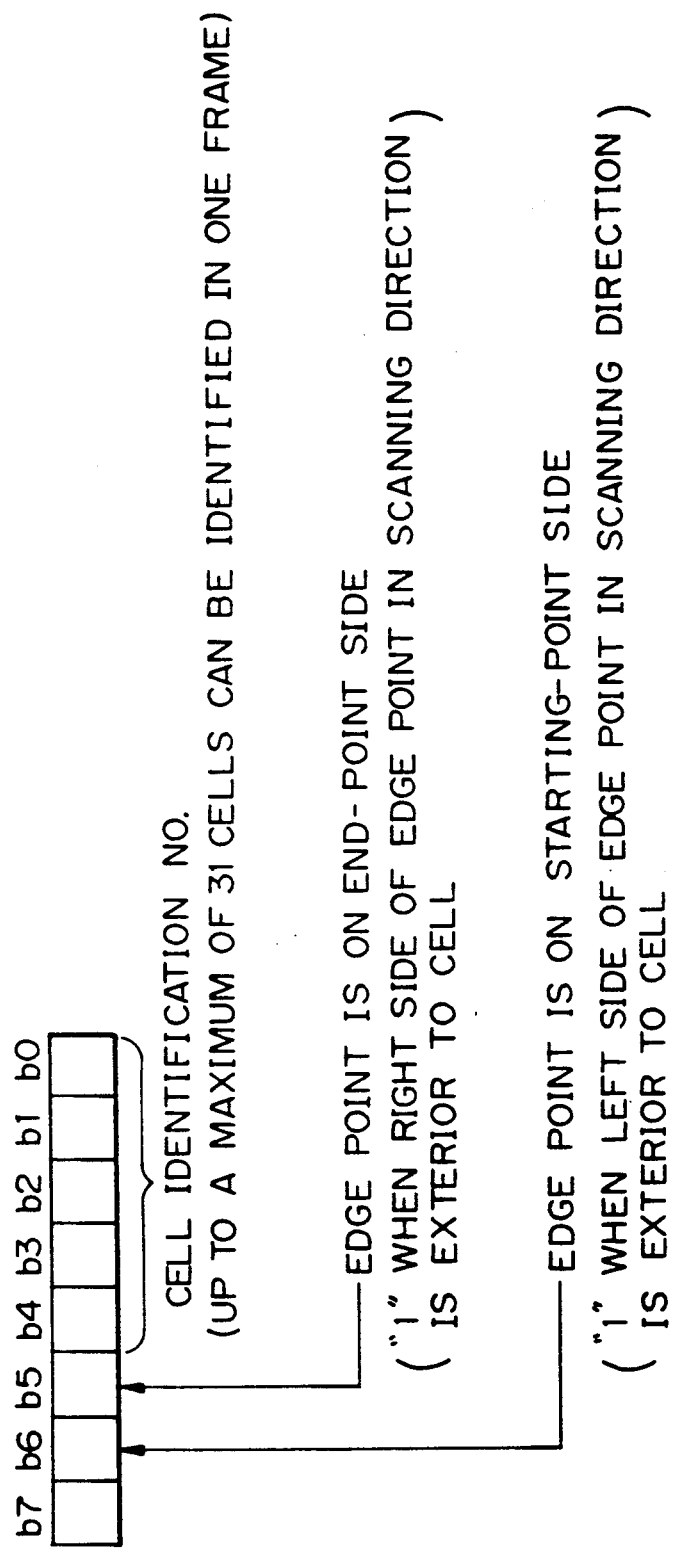
FIG. 3 is an explanatory view illustrating an example of a cell identification code which is a characterizing feature of the present invention.

In accordance with the invention, a code peculiar to the invention, namely a cell identification code, is generated for each edge besides the chain code at the time of edge tracing. The cell identification codes replace the edge detection information in the image memory. One example of a cell identification code is shown in FIG. 3. In this example, a cell number, which is for identifying a cell when a large number of cells are present in one imaged frame, is expressed by five bits $b_0$ through $b_4$, and whether an edge point of the cell is located on a starting-point side or end-point side of the cell as seen in the pixel-by-pixel image scanning direction is expressed by two bits $b_5$ and $b_6$. In the case of an ordinary television (raster scanning-type), the pixel-by-pixel image scanning direction is from left to right in the horizontal direction. In the description of this embodiment, therefore, the pixel-by-pixel scan in image processing shall also be taken as being from left to right in the horizontal direction. When a certain pixel is an edge on the starting-point side of a cell, this means that when processing (scanning) is performed one pixel at a time in the horizontal direction, the cell image portion starts from this pixel. In other words, when scanning is performed in the horizontal direction from the left side, the left side of an edge on the starting-point side is outside the cell. In the present embodiment, "1" is written in the bit $b_6$ of the cell identification code with regard to a pixel which is an edge on the starting-point side. When a certain pixel is an edge on the end-point side of a cell, this means that when processing (scanning) is performed one pixel at a time in the horizontal direction, the cell image portion ends at this pixel. In other words, when scanning is performed in the horizontal direction from the left side, the right side of an edge on the end-point side is outside the cell. In the present embodiment, "1" is written in the bit $b_5$ of the cell identification code with regard to a pixel which is an edge on the end-point side.

The code of two bits $b_5$, $b_6$ can readily be obtained from the edge detection information at the time of edge tracing. An example in which an edge point is so coded will be described hereinbelow.

Figure 17:
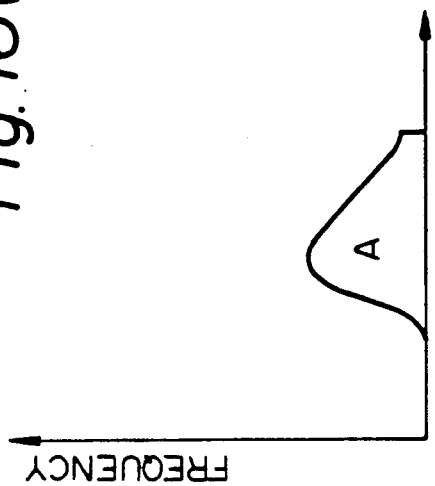
FIG. 17 is an explanatory view illustrating an example of assigning edge detection information.
Figure 16B:
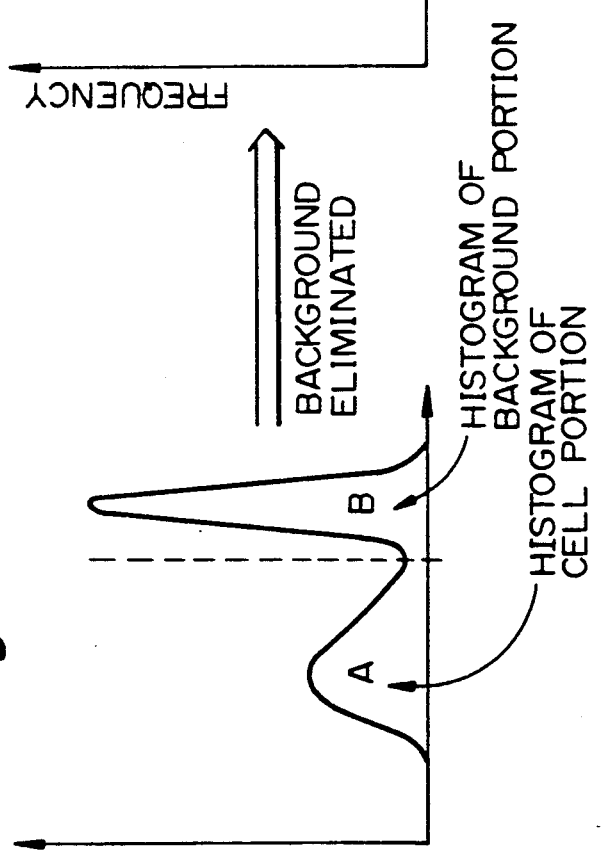

As set forth earlier, edge detection information refers to a value decided in accordance with each pixel of an image. If a corresponding pixel is not an edge, the value assigned is "0"; if it is an edge, the assigned value is a non-zero value indicating in which direction the next neighboring edge is located when the periphery of the cell is traversed in the clockwise direction. Though there are various ways in which the values can be assigned, it will be assumed here that the values shown in FIG. 17 are assigned in order to facilitate the description.

Figure 4:
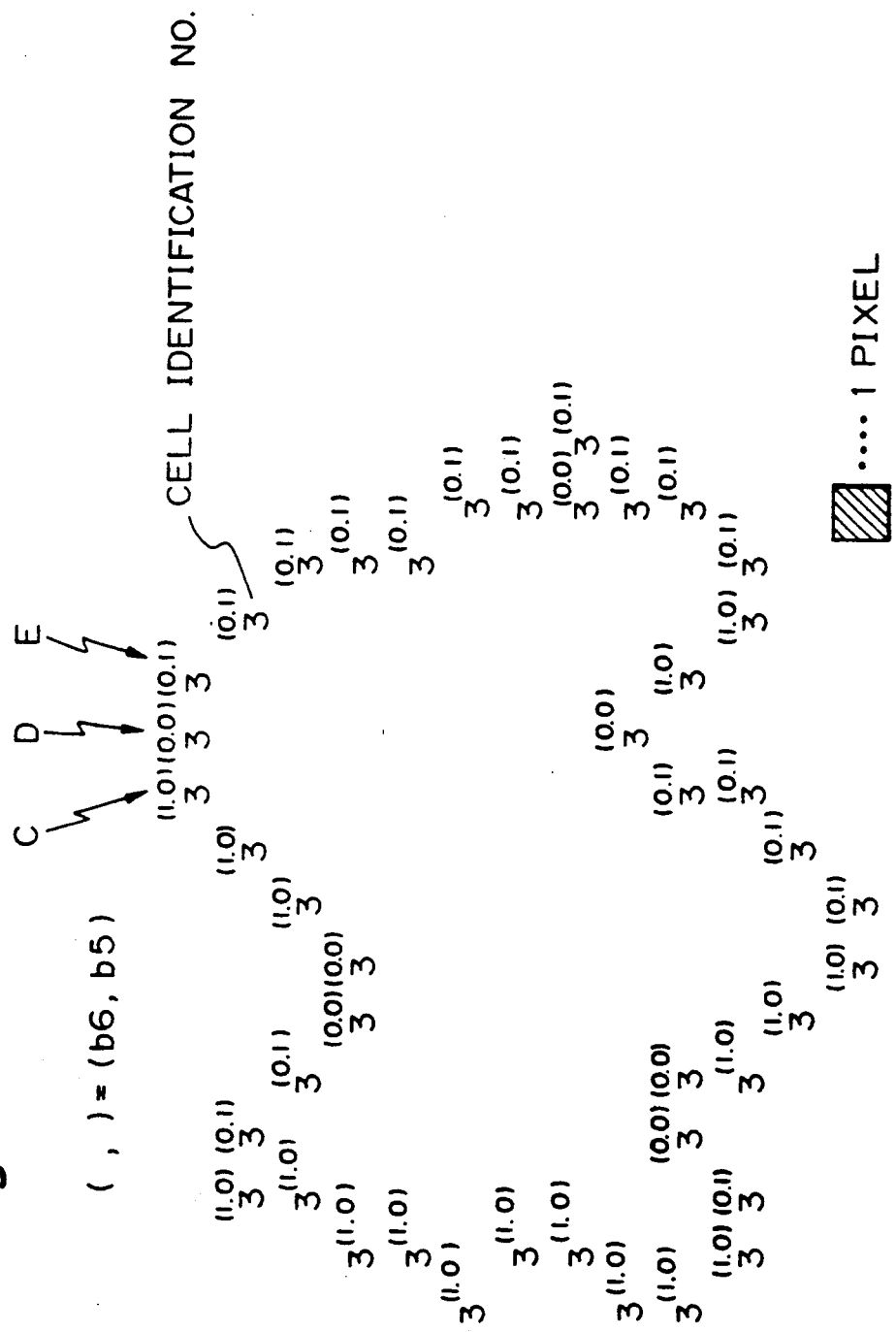

In the edge tracing example shown in FIG. 4, the starting point of tracing is a point C, namely the first point on the edge of a cell of interest hit when the image is scanned in a television scanning method. Since the next edge point neighboring the point C is on the right side, edge detection information "a" is assigned to the point C in accordance with the rule shown in FIG. 17. The edge detection information "a" at the point C is converted into a cell identification code in which the bit $b_5$ is "0" and the bit $b_6$ is "1". The reason for making this conversion is obvious in view of the aforementioned definition of the bits $b_5$ and $b_6$. In FIG. 4, the contents of the two bits $b_6$, are represented by ($b_6$, $b_5$). That is, the two-bit code of point C is (1, 0).

The edge detection information for a point D which is the next edge point also takes on the value "a". Therefore, $b_5$ of the cell identification code for point D is "0", and $b_6$ is "0" because the edge detection information for point C, which is the immediately preceding edge point, had the value "a". Thus, the code of point D is expressed by (0, 0).

The edge detection information for a point E which is the next edge point takes on a value "h". Therefore, $b_5$ of the cell identification code for point E is "1", and $b_6$ is "0" because the edge detection information for point D, which is the immediately preceding edge point, had the value "a". Thus, the code of point E is expressed by (0, 1).

Figure 5:
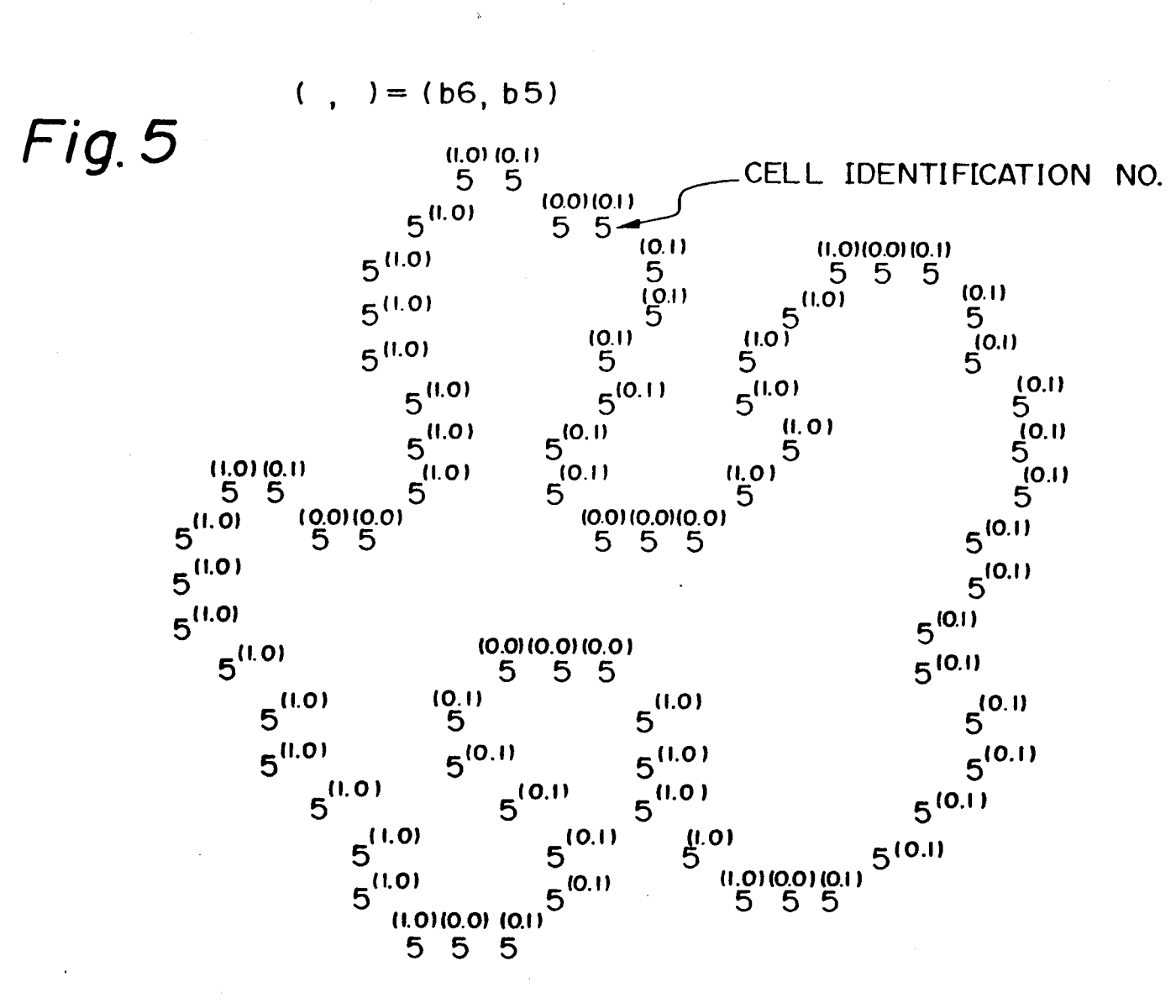

Thus, a cell identification code for each edge point can be obtained while edge tracing is performed based on the edge detection information. FIG. 5 illustrates an example in which another cell image is subjected to edge tracing and cell identification codes are obtained in the same manner. The numerals 3 in FIG. 4 and the numerals 5 in FIG. 5 represent cell numbers. Naturally, the same cell number is assigned to each edge point of the same cell.

As mentioned above, edge detection information indicative of pixels other than those at edge points is "0". Therefore, even after the edge detection information in the image memory is replaced by the above-mentioned cell identification codes, pixels other than edge points remain unchanged, i.e., "0" [the code for these pixels being (0, 0)].

The edge tracing which includes the above-described encoding processing is executed by a microprogram. The processing speed is about 10 $\mu$ per edge point, so that processing can be executed for about 1,500 edge points in 16.7 ms, which is the vertical synchronization cycle. Assuming that there are 150 edge points per cell, this means that up to ten cells can be edge traced in a single vertical synchronization cycle.

Next, reference will be made to the flowchart of FIG. 6 to describe a procedure for obtaining cell image parameters such as cumulative chromaticity information and chromatically histograms for each cell based on the information acquired by making the conversion from the edge detection information to the cell identification codes. This procedure is realized by providing an image processor board having the functions of a decoder for reading the cell identification codes, a memory, an adder and an incrementer, etc. FIG. 7 is a block diagram of a main part of this image processor board. The description that follows is based on this block diagram.

Figure 1:
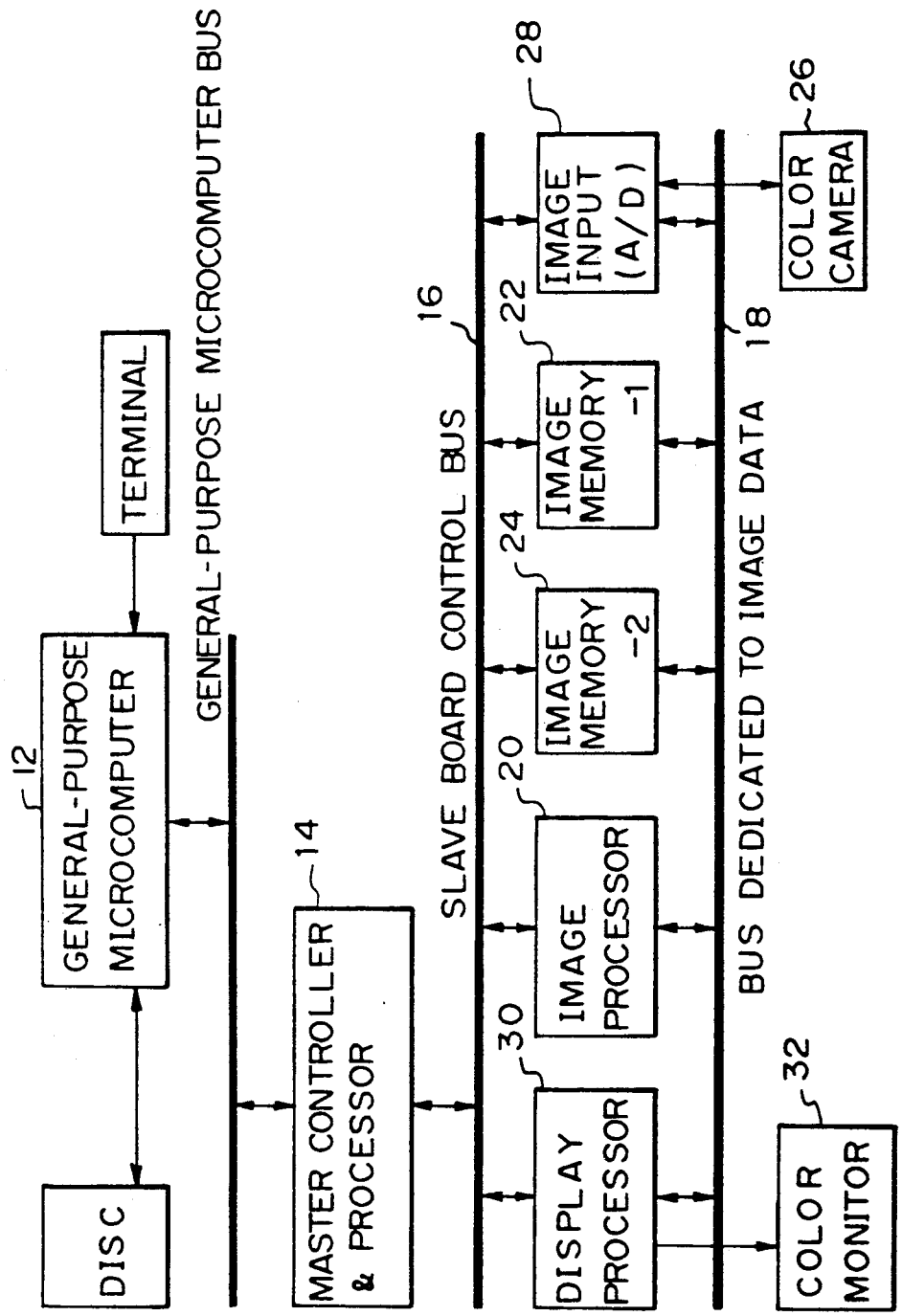
FIG. 1 is a block diagram illustrating an example of an image processing apparatus having a bus dedicated to image data.

The orignal image data and cell identification codes stored respectively in the image memory boards 22 and 24 of FIG. 1 are inputted to the image processor board 20 via the bus 18 dedicated to image data. The flow of these data on the bus 18 takes place at a timing the same as that of raster scanning in television. Data flow is in order from the data at the upper left end of the screen.

The cell identification codes are inputted to a latch circuit 38 in the processor board 20 via a line 36. The image data for each pixel is inputted to a latch circuit 42 via a line 40. A pixel synchronizing clock, which is one signal on the dedicated bus, is inputted to CLK terminals of the latch circuits 38, 42 via a line 44. The cell identification codes are latched in the latch circuit 38 synchronously with the pixel clock.

The cell numbers expressed by the five bits of the cell identification codes are outputted from the latch circuit 38 to a line 46. The content of the bit $b_6$, which is the bit in the cell identification codes that indicates whether a pixel presently being processed is an edge point on the left side (starting-point side) of a cell, is out-putted from the latch circuit 38 to a line 48. A gate 50 takes the logical product of the signal on line 48 and the pixel synchronizing clock on line 44 and delivers the result to the CLK terminal of a latch circuit 52. If the bit $b_6$ is "1", namely if the above-mentioned pixel is an edge point on the left side, the cell number on line 46 is latched in the latch circuit 52.

This cell number is expressed by as numeral of from 1 to 31, the number 0 not being used. The latched cell number is supplied to the higher order address line of a histogram memory 54 and to an address line of a cumulative chromaticity memory 56 via a line 58. Meanwhile, the image data is latched in the latched circuit 42 synchronously with the pixel clock, and this data is inputted via a line 62 to a lower order address line of the histogram memory 54 and an adder 60 for computing cumulative chromaticity.

The histogram memory 54, which is provided with the cell number and pixel data as addresses, outputs a frequency value stored at a memory address corresponding to the value of the pixel data for the particular cell. The frequency value is outputted on a line 64. Though this value is initially "0", the value is incremented by an incrementer 66 whenever the pixel data of the cell is inputted to the histogram memory 54, and the result is written in the former same memory address to achieve updating.

The cumulative chromaticity memory 56, which is provided with the cell number as an address, outputs a cumulative value of pixel data stored at a memory address corresponding to the particular cell. This cumulative value is outputted on a line 68. Though this value is initially "0", the value is added to the prevailing cumulative value by an adder 60 whenever pixel data of the cell arrives and the result is again stored in the memory address corresponding to the cell to achieve updating.

The foregoing processing is executed with respect to all data in the period of time from the moment it is determined that the bit $b_6$ of the cell identification code is "1" until a cell identification code in which the bit $b_5$ is "1" arrives. As mentioned earlier, the fact that the bit $b_5$ is "1" means that the pixel corresponding to the cell identification code is an edge point, and that the right side of this edge is on the outside of the cell.

The content of the bit $b_5$, which is the bit in the cell identification codes that indicates whether a pixel presently being processed is an edge point on the right side (end-point side) of a cell, is outputted from the latch circuit 38 to a line 70. When bit $b_5$ becomes "1", the signal on line 70 is inputted to the CLR terminal of the latch circuit 52 via the flip-flops 72, 74 and a gate 76. The latch circuit is cleared at this time and the cell number outputted on line 58 becomes 0. Since the arranged is such that the cell number 0 is not used for numbering a cell, as mentioned above, the cell number 0 represents a portion within the image that is outside the cell. The results of processing image data indicative of the portion outside a cell, namely background, are stored at memory addresses of the histogram memory 54 and cumulative chromaticity memory 56 that correspond to the cell number 0. Accordingly, regardless of whether image data is indicative of a cell portion or background, the incrementer 66 and adder 60 are capable of subjecting all image data to the same processing so that the control circuit for this processing is simply constructed.

The two stages of flip-flops 72, 74 are for providing a delay in order to also subject the image data indicative of the right-side edge point of a cell to the foregoing processing as data indicative of the interior of the cell.

Horizontal synchronizing pulses are inputted to the CLR terminal of the latch circuit 52 via line 78 and gate 76. Since the gate 76 takes the logical sum of these pulses and the Q output of the flip-flop 74, the latch circuit 52 is cleared when the bit $b_5$ becomes "1" or when a horizontal synchronizing pulse is inputted thereto. As will be understood from the foregoing description, if a plurality of cells are present in a single scan of the image in the horizontal direction, the cell number is latched by a left-side edge point of one cell in the scanning direction. The incrementer 66 and adder 60 execute processing with this cell number kept as is until the right-side edge of the cell in the scanning direction is passed. After this right-side edge is passed, the cell number is cleared to 0, followed by execution of the foregoing processing. When the left-side edge point of the next cell in the scanning direction is reached, the cell number of this cell is latched and processing similar to that described above is then carried out. When scanning in the horizontal direction reaches the right edge of the image, the cell number is cleared to 0 by a horizontal synchronizing pulse and the next horizontal line is then scanned.

When the foregoing processing has been performed for all pixels in one frame of image data, cumulative chromaticity information and chromaticity histograms of each individual cell present in the image are obtained simultaneously. If three sets of incrementers, adders and memories are provided, information regarding a maximum of up to 31 cells can be obtained simultaneously in one vertical synchronizing cycle for each of the colors R (red), G (green) and B (blue).

Though not shown in the block diagram of FIG. 7, the histogram memory 54 and cumulative chromaticity memory 56 are also connected to the slave board control bus 16 so that the contents of these memories can be accessed by the master controller and processor 14. As a result, processing such as for calculating the area of a cell by adding up the frequency values of the cell chromaticity histogram after the histogram is obtained can readily be performed by the master controller and processor.

If the original image data is used as the image data, the cumulative chromaticity information and chromaticity histograms can be obtained as described above. However, if the aforementioned image gradient data is used as the image data, then cumulative gradient information and a gradient histogram can be obtained. It is also possible to use image data, which is of a type different from that mentioned above, obtained by making a conversion into data which makes cell features more conspicuous.

In the present embodiment, the cell identification code is one in which a cell number and edge information are written in one word of eight bits, as shown in FIG. 3. However, it is possible to adopt an arrangement in which the cell identification code is divided into two or more words in each of which a cell number or image information may be written. It is also possible to increase the cell number to more than five bits so that more cells can be processed at one time.

Figure 6:
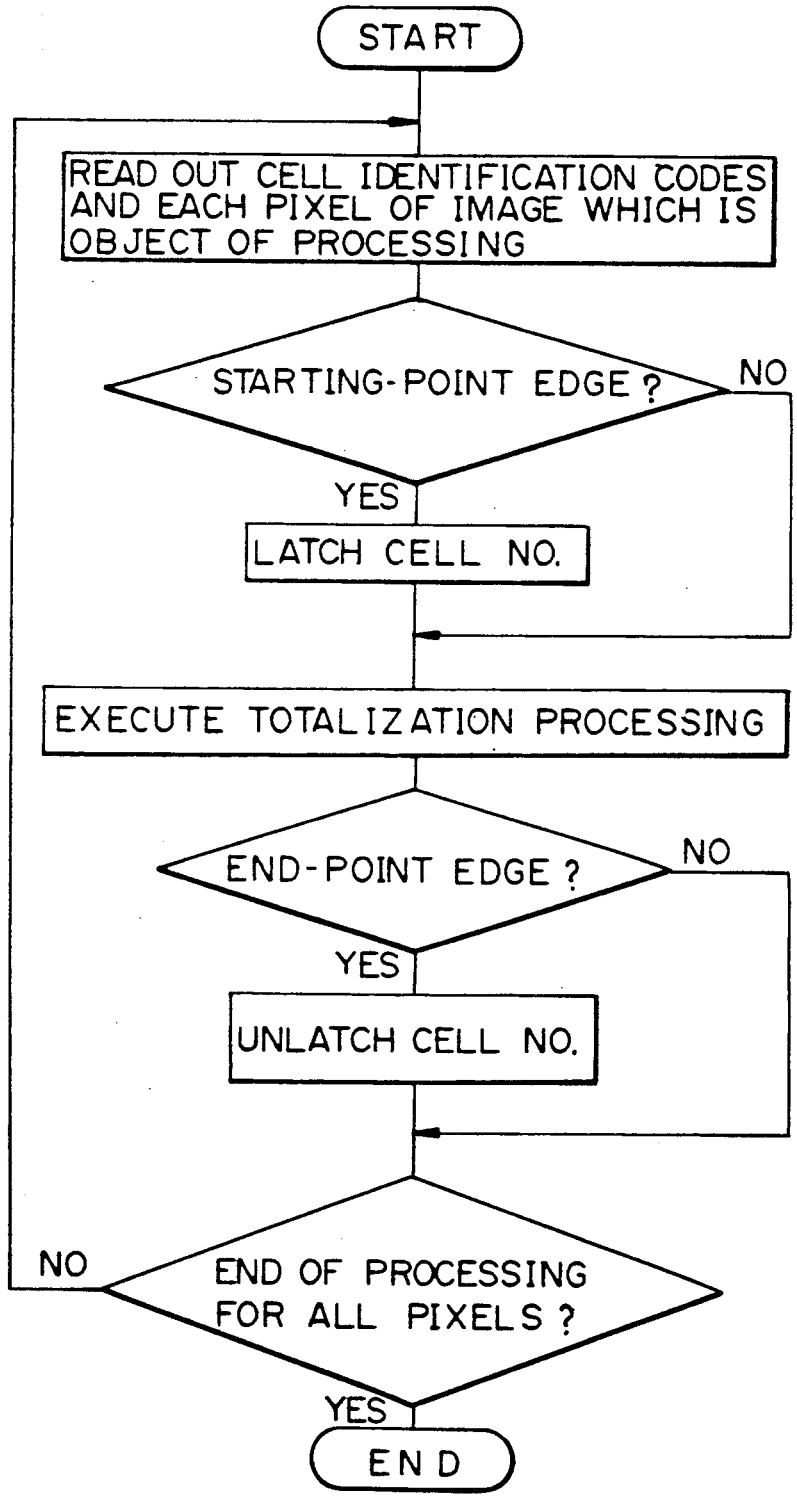
FIG. 6 is a flowchart illustrating an embodiment of a procedure for deriving cell image parameters in accordance with the present invention.
Figure 7:
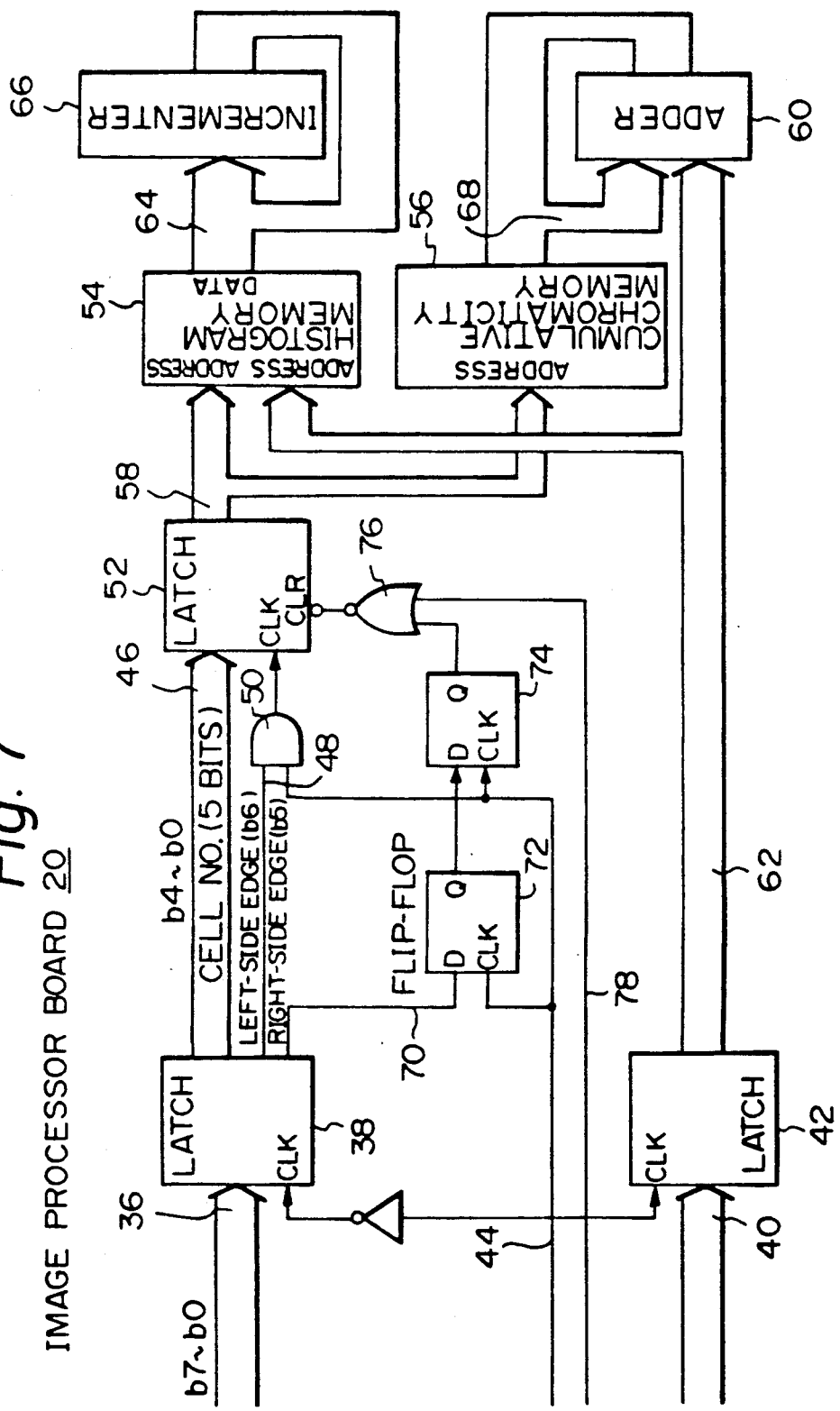
FIG. 7 is a block diagram illustrating the construction of an image processor board used in the same embodiment.
Figure 8:
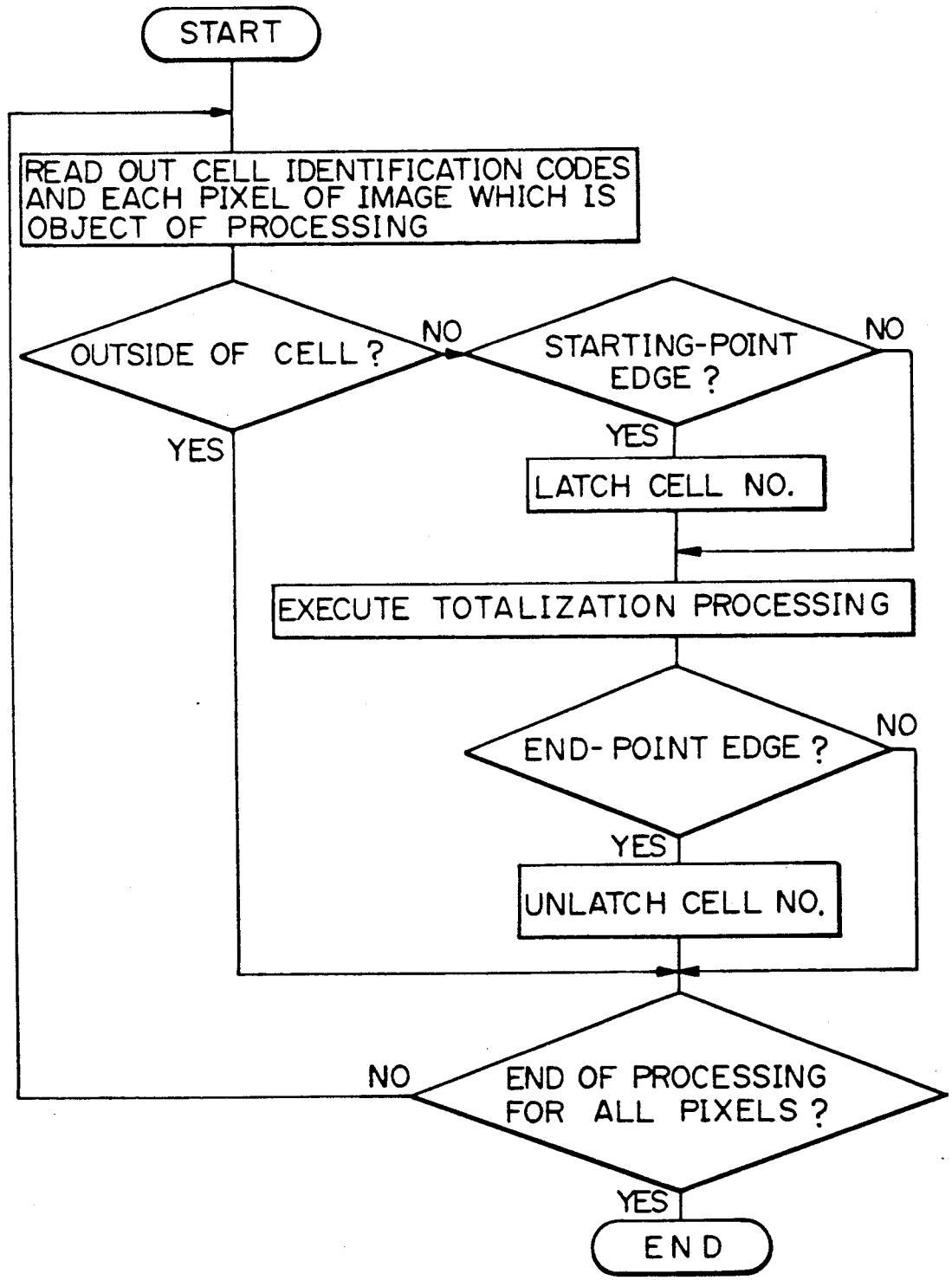
FIG. 8 is a flowchart illustrating another embodiment of a procedure for deriving cell image parameters in accordance with the present invention.
Figure 9:
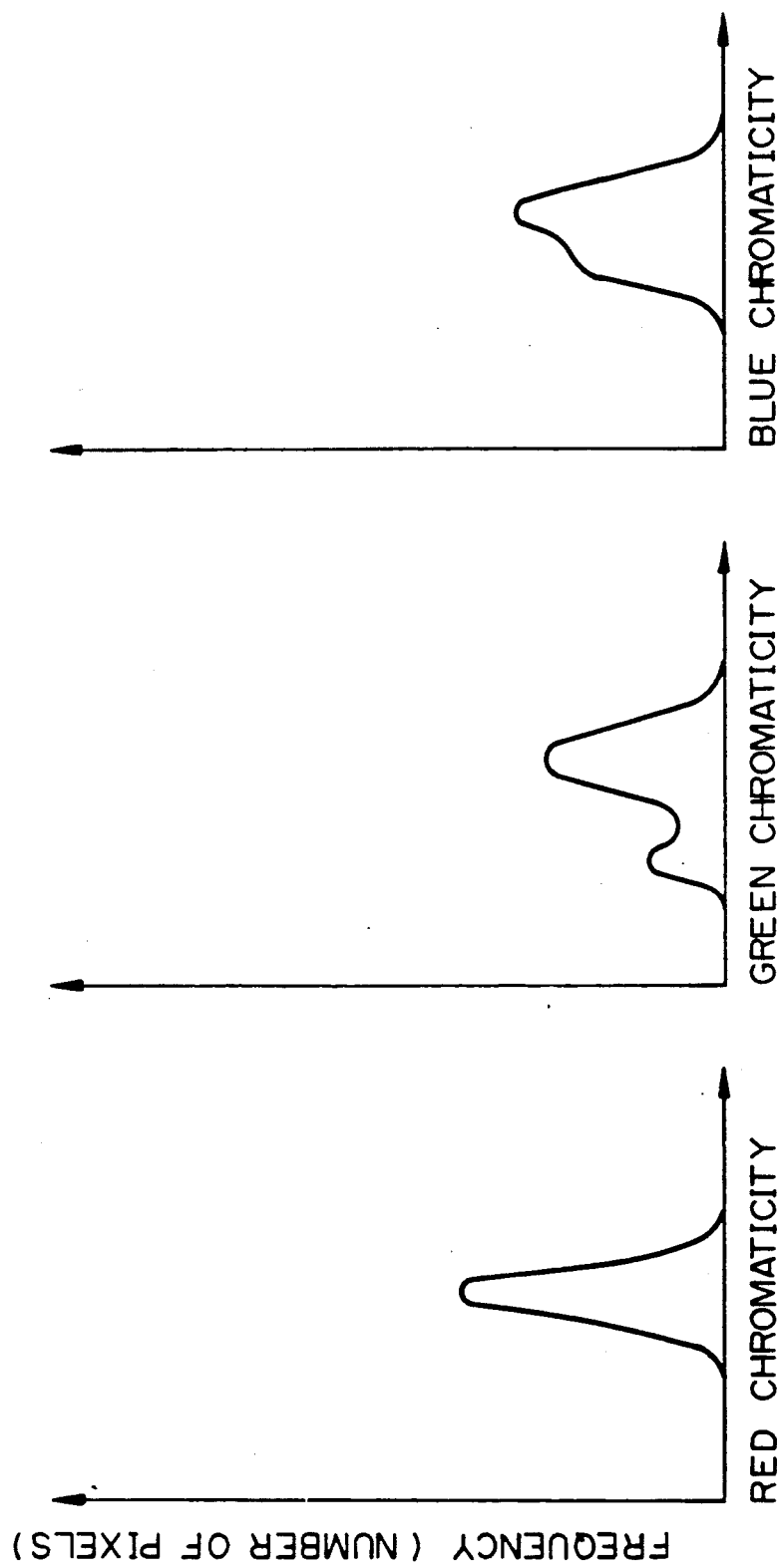
FIG. 9 is an explanatory view illustrating chromaticity histograms of a cell.
Figure 10:
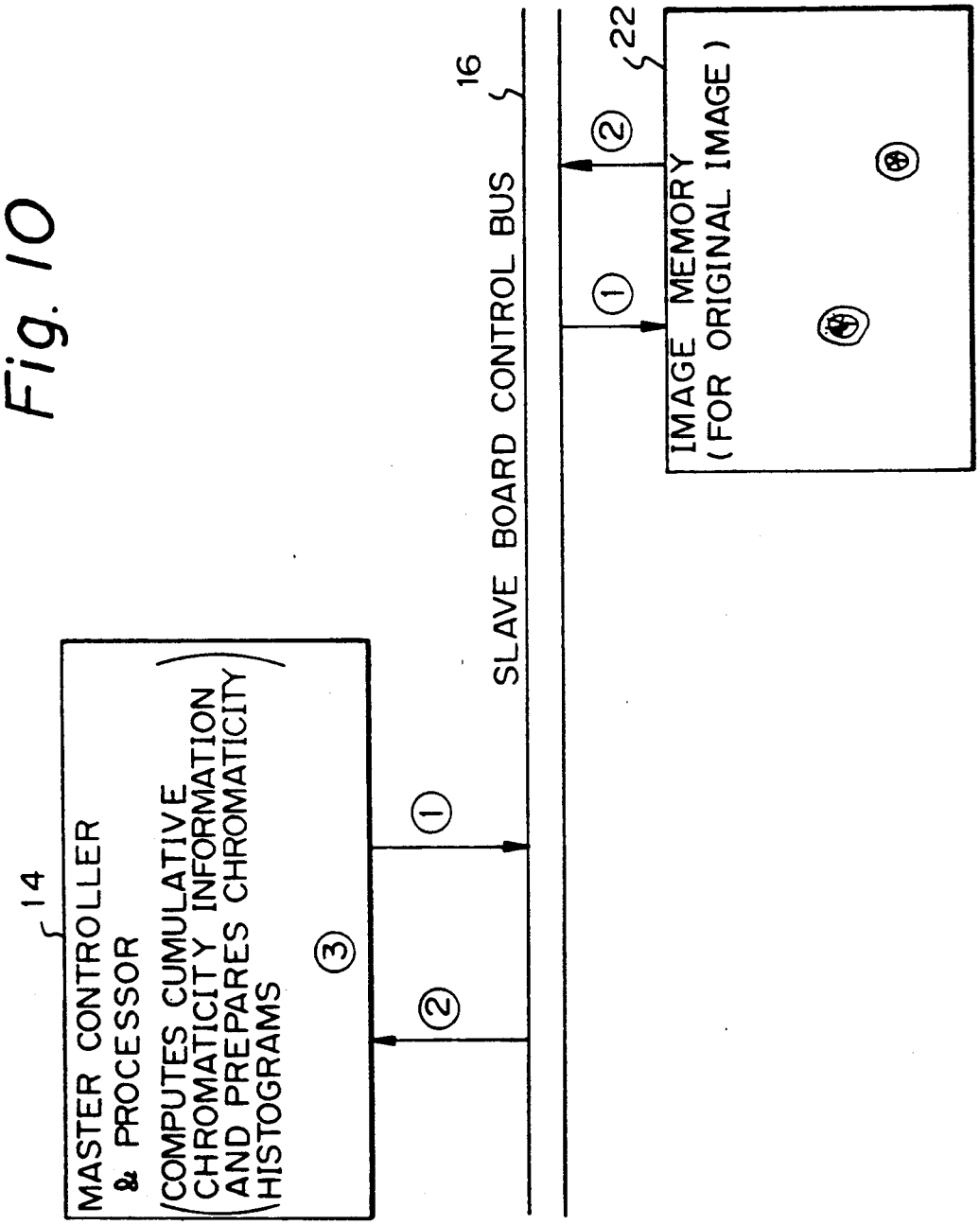
FIG. 10 is an explantory view illustrating a procedure for deriving cell image parameters in accordance with a Prior-Art method I.
Figure 11:
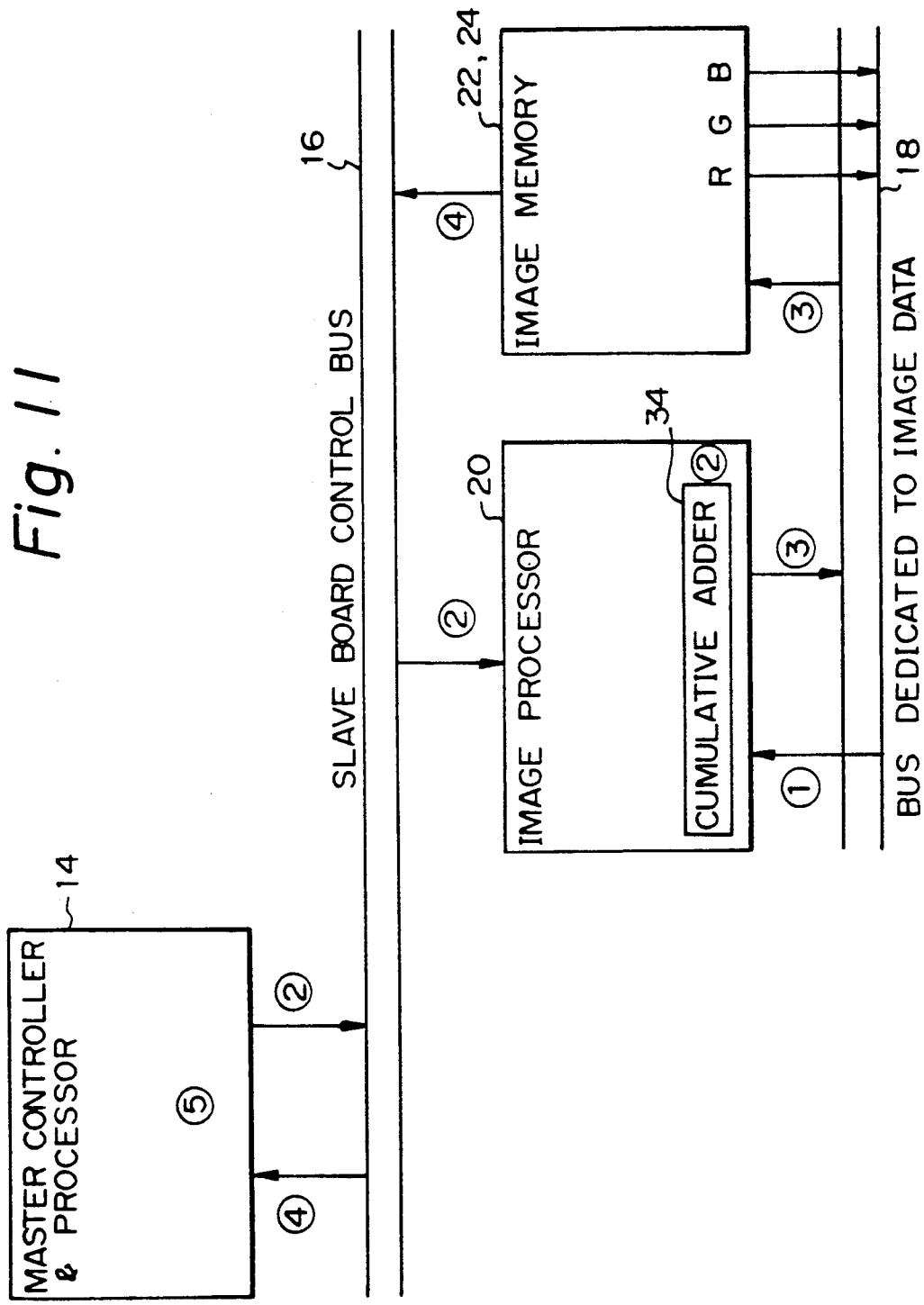
FIG. 11 is an explanatory view illustrating a procedure for deriving cumulative chromaticity information in accordance with a Prior-Art Method II.
Figure 12:
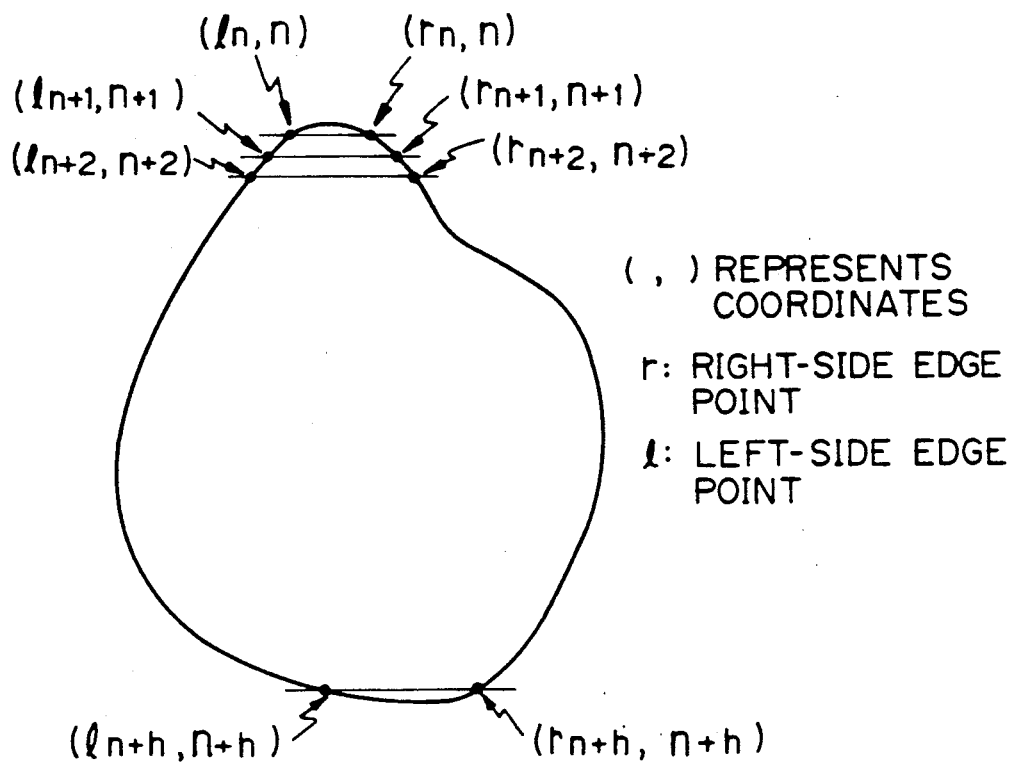
FIG. 12 is an explanatory view illustrating edge points of a cell.
Figure 13:
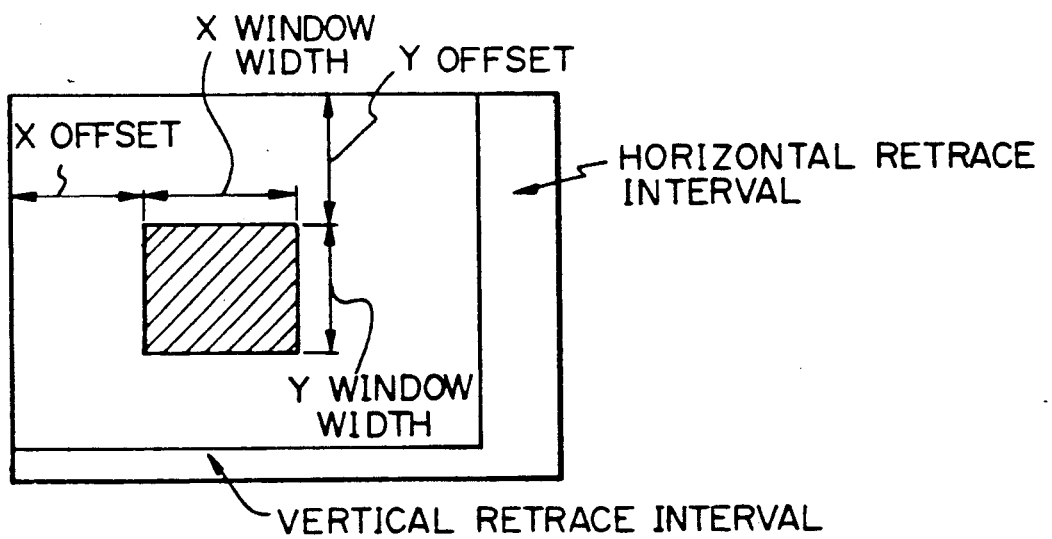
FIG. 13 is an explanatory view illustrating a window.
Figure 14:
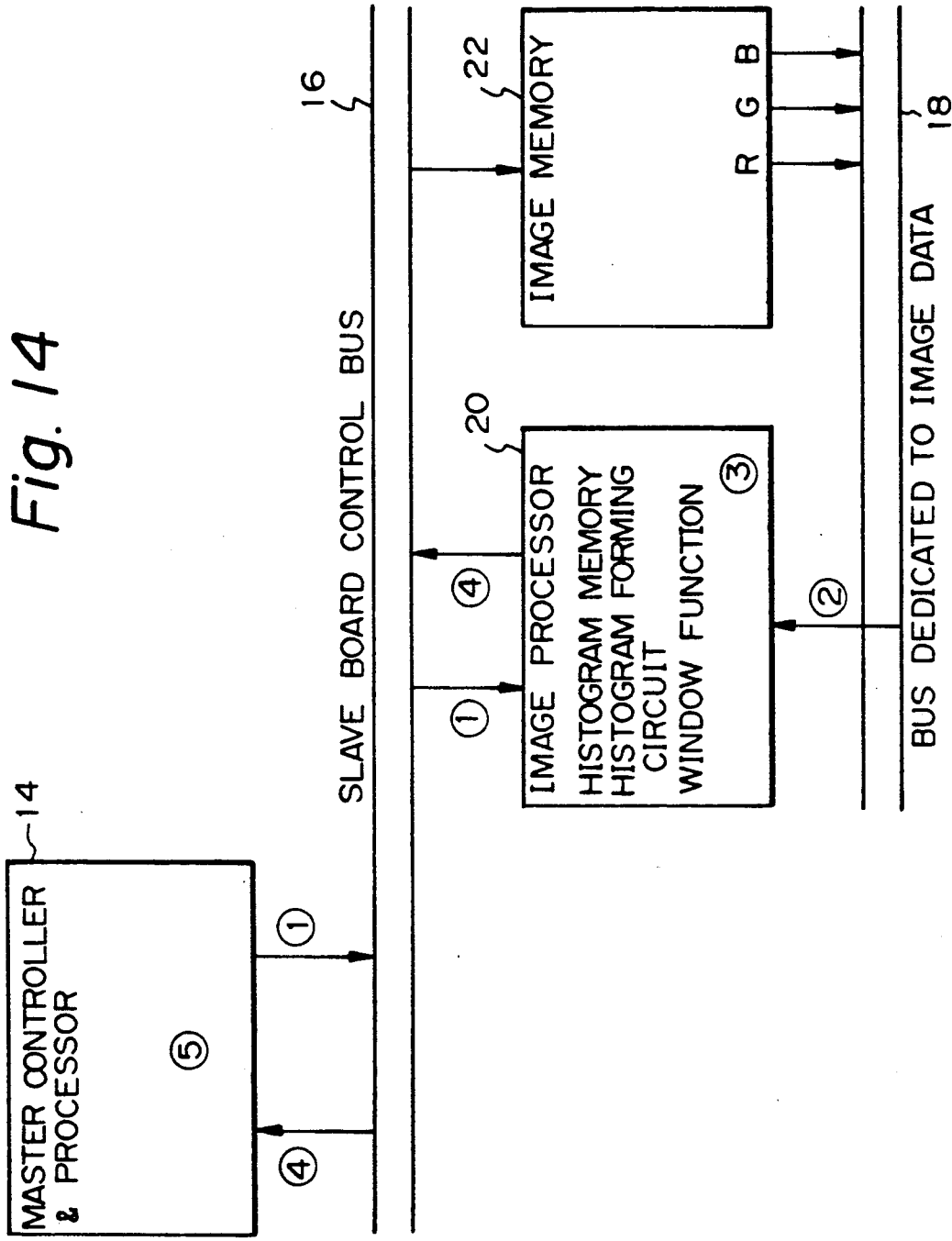
FIG. 14 is an explanatory view illustrating a procedure for deriving a chromaticity histogram in accordance with the Prior-Art Method II.
Figure 15:
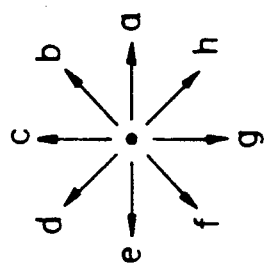
FIG. 15 is an explanatory view illustrating a cell surrounded by a window.
Figure 16A:
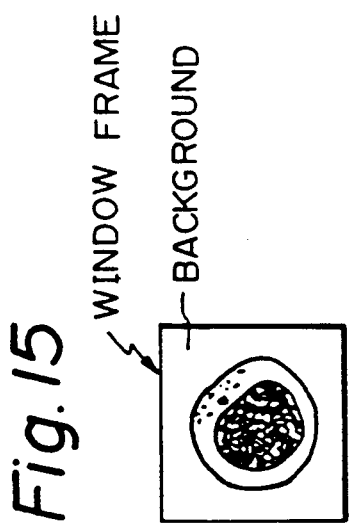
FIG. 16 is an explanatory view of chromaticity histograms obtained in accordance with the Prior-Art Method II, in which (a) shows a chromaticity histogram before removal of the portion of background, and (b) shows a chromaticity histogram after removal of the portion of background.

Furthermore, in the process for deriving cell image parameters shown in FIG. 6, it is permissible to arrange it so that after a cell identification code and each pixel of the image which is the object of processing are read out, whether or not the pixels of the image are outside the cell is determined from the cell identification code and, when a pixel is determined to be outside the cell, the next pixel is dealt with without subjecting the outside pixel to processing. The flowchart for such an arrangement is shown in FIG. 8. Unlike the block diagram shown in FIG. 7, however, it will be necessary to effect a changeover between performing the processing of the incrementer 66 and adder 60 or not performing this processing depending upon whether pixel data is indicative of a cell portion or background. The control circuitry for this purpose is somewhat complicated.

The present invention has the following advantages:

(1) Even if a large number of cells are present in one imaged frame, cell image parameters such as cumulative chromaticity information and chromaticity histograms for all of the cells can be obtained at one time in a highly efficient manner.

(2) Since the cell image parameters of each cell are obtained by the image processor board, the master controller & processor need not be burdened with this task. Consequently, a limitation upon the processing capability of the master controller & processor no longer translates into a limitation upon the processing capability of the image processing apparatus overall.

(3) Since the cell identification codes peculiar to the present invention are stored in the image memory in place of edge detection information, it is unnecessary to provide a separate memory for this code data. This is advantageous in terms of cost and space.

(4) By virtue of the foregoing advantages (1) through (3), realtime processing of an image frame that changes every one-sixtieth of a second can be realized at low cost.

(5) Since totalization processing for obtaining cell image parameters is executed solely for cell image portions and not background, it is possible to obtain accurate histograms solely of these cell image portions.

As many apparently widely different embodiments of the present invention can be made without departing from the spirit and scope thereof, it is to be understood that the invention is not limited to the specific embodiments thereof except as defined in the appended claims.

What is claimed is:

1. A cell image processing method comprising the steps of:
    capturing a cell image by image pickup means;
    storing the captured image data as original image data;
    binarizing the original image data upon identifying a background portion and cell image portions contained in the original image data;
    deriving cell edge detection information comprising data indicating a pixel being an edge point on a periphery of the cell image portion and data indicating a direction to a located position of a next neighboring edge point for each pixel on a periphery of each of the cell image portions from said binarized image data;
    tracing cell edges, in order to obtain edge points of the cells, by referring to the edge detection information;
    and deriving various cell image parameters by referring to results obtained in said cell edge tracing step;
    said method characterized by further comprising the steps of:
    storing each of the number of said edge points on each horizontal scanning line;
    deriving cell identification codes in said edge tracing step by assigning data indicating a direction to a located position of neighboring edge points to each of said edge points of each of said cell image portions, based upon data indicating which side of said edge point is exterior to the cell as seen from the image scanning direction, and by assigning data indicating the same cell number to each of the edge points in the same cell image portion, this step being repeated until said stored number of said edge points is reduced one by one upon tracing said each edge point, and said stored number of edge points of one image frame becomes zero, thereby ensuring cell indentification codes are assigned to all of said cell image portions; and
    deriving said cell image parameters by successively reading out said cell image data and said cell identification codes and by correlating them with each pixel to obtain histograms of each said cell image portion.

2. A cell image processing method comprising the steps of:
    capturing a cell image by image pickup means;
    storing the captured image data as original image data;
    binarizing the image data upon identifying a background portion and cell image portions contained in the original image data;
    deriving cell edge detection information for each pixel from binarized image data;
    tracing cell edges, in order to obtain edge points of the cells, by referring to the edge detection information;
    and deriving various cell image parameters by referring to results obtained in said cell edge tracing step;
    characterized by deriving cell identification codes when the edge tracing is performed, said cell identification codes identifying each edge point to indicate which edge point belongs to which cell and indicating which side of said edge point is exterior to the cell as seen an image scanning direction, said cell image parameters being derived by the steps of:
    successively reading out said original image data and said cell identification codes associated with each pixel;
    adopting the original image data as an image data which is the object of image processing, and determining from the cell identification codes whether each pixel of the image data which is the object of image processing is an edge on a starting-point side of a cell as seen in the pixel-by-pixel image scanning direction;
    latching a cell number read from the cell identification codes when it is determined that said pixel is an edge on the starting-point side;
    totalizing image data of each pixel cell number by cell number;
    determining from the identification codes whether each pixel of the image data which is the object of image processing is an edge on a end-point side of a cell as seen in the pixel-by-pixel image scanning direction;
    clearing said cell number when is is determined that said pixel is an edge on the end-point side;
    and determining whether processing of all pixels has ended.

3. The method according to claim 2, wherein said step of deriving the cell image parameters includes a step of determining, from the cell identification codes, whether each pixel of the image data which is the object of processing is exterior to a cell, wherein when a pixel is determined to be exterior to a cell, the next pixel is dealt with without said exterior pixel being subjected to processing.

4. The method according to claim 2 or 3, wherein totalizing is processing for making a histogram of image data within a cell.

5. The method according to claim 2 or 3, wherein totalizing is processing for cumulatively adding image data within a cell.

6. The method according to claim 2 or 3, wherein totalizing is processing for making a histogram and processing for cumulatively adding image data within a cell.

7. The method according to claim 4 or 6, wherein a cell image parameter obtained by histogram making processing is a chromaticity histogram or gradient histogram.

8. The method according to claim 5 or 6, wherein a cell image parameter obtained by cumulative addition processing is cumulative chromaticity information or cumulative gradient information.

9. A cell image processing method comprising the steps of:
    capturing a cell image by image pickup means;

storing the captured image data as original image data;

deriving a processed image data by subjecting the original image data to processing for making cell features more conspicuous;

binarizing the image data upon identifying a background portion and cell image portions contained in the original image data;

deriving cell edge detection information comprising data indicating a pixel being an edge point on a periphery of the cell image portion and data indicating a direction to a located position of a next neighboring edge point for each pixel on a periphery of each of the cell image portions from said binarized image data;

tracing cell edges, in order to obtain edge points of the cells, by referring to the edge detection information; and deriving various cell image parameters by referring to results obtained in said cell edge tracing step;

said method characterized by further comprising the steps of:

storing each of the number of said edge points on each horizontal scanning line;

deriving cell identification codes in said edge tracing step by assigning data indicating a direction to a located position of neighboring edge points to each of said edge points of each of said cell image portions, based upon data indicating which side of said edge point is exterior to the cell as seen from the image scanning direction, and by assigning data indicating the same cell number to each of the edge points in the same cell image portions, this step being repeated until said stored number of said edge points is reduced one by one upon tracing said each edge point, and said stored number of edge points of one image frame becomes zero, thereby ensuring cell identification codes are assigned to all of said cell image portions; and deriving said cell image parameters by successively reading out said processed image data and said cell identification codes and by correlating them with each pixel to obtain histograms of each said cell image portion.

10. A cell image processing method comprising the steps of: capturing a cell image by image pickup means;

storing the captured image data as original image data;

deriving a processed image data by subjecting the original image data to processing for making cell features more conspicuous;

binarizing the image data upon identifying a background portion and cell image portions contained in the original image data;

deriving cell edge detection information for each pixel from the binarized image data;

tracing cell edges, in order to obtain edge points of the cells, by referring to the edge detection information;

and deriving various cell image parameters by referring to results obtained in said cell edge tracing step;

characterized by deriving cell identification codes when the edge tracing is performed, said cell identification codes identifying each edge point to indicate which edge point belongs to which cell and indicating which side of said edge point is exterior to the cell as seen an image scanning direction, said cell image parameters being derived by the steps of:

successively reading out said processed image data and said cell indentification associated with each pixel;

adopting the processed image data as an image data which is the object of image processing, and determining from the cell identification codes whether each pixel of the image data which is the object of image processing is an edge on a starting-point side of a cell as seen in the pixel-by-pixel image scanning direction;

latching a cell number read from the cell identifications codes when it is determined that said pixel is an edge on the starting-point side;

totalizing image data of each pixel cell number by cell number;

determining from the identification codes whether each pixel of the image field which is the object of image processing is an edge on an end-point side of a cell as seen in the pixel-by-pixel image scanning direction;

clearing said cell number when it is determined that said pixel is an edge on the end-point side; and determining whether processing of all pixels has ended.

11. The method according to claim 10, wherein said step of deriving the cell image parameters includes a step of determining, from the cell identification codes, whether each pixel of the image data which is the object of processing is exterior to a cell, wherein when a pixel is determined to be exterior to a cell, the next pixel is dealt with without said exterior pixel being subjected to processing.

12. The method according to claim 10 or 11, wherein totalizing is processing for making a histogram of image data within a cell.

13. The method according to claim 10 or 11, wherein totalizing is processing for cumulatively adding image data within a cell.

14. The method according to claim 10 or 11, wherein totalizing is processing for making a histogram and processing for cumulatively adding image data within a cell.

15. The method according to claim 12 or 14, wherein a cell image parameter obtained by histogram making processing is a chromaticity histogram or gradient histogram.

16. The method according to claim 13 or 14, wherein a cell image parameter obtained by cumulative addition processing is cumulative chromaticity information or cumulative gradient information.

17. A cell image processing apparatus employing a method of capturing a cell image by image pick-up means, storing the captured image data as an original image data, adopting the original image data, or a processed image data obtained by subjecting the original image data to processing for making cell features more conspicuous, as an image data which is the object of image processing, binarizing the image field upon identifying a background portion and cell image portions contained in the original image field, deriving cell edge detection information for each pixel from the binarized image data, tracing cell edges, in order to obtain edge points of the cells, by referring to the edge detection information, and deriving various cell image parameters by referring to results of edge tracing, the apparatus comprising:

means for deriving cell identification codes identifying each of the edge points to indicate which edge point of said image data which is the object of image processing belongs to which cell and indicating which side of the edge point is exterior to the cell as seen in an image scanning direction;

means for successively reading out said image data which is the object of image processing and said cell identification codes upon correlating them with each pixel;

means for reading a cell number from the cell identification code;

means for determining from the cell identification codes whether each pixel of the image data which is the object of image processing is an edge on a starting-point side of a cell as seen in the pixel-by-pixel scanning direction;

means for latching said cell number when it is determined that said pixel is an edge on the starting-point side;

means for totalizing image data of each pixel cell number by cell number;

means for determining from the identification codes whether each pixel of the image data which is the object of image processing is an edge of an end-point side of a cell as seen in the pixel-by-pixel scanning direction;

means for clearing said cell number when it is determined that said pixel is an edge on the end-point side; and means for determining whether processing of all pixels has ended.

18. The apparatus according to claim 17, wherein said totalizing means comprises processing means for making a histogram of image data within a cell.

19. The apparatus according to claim 17, wherein said totalizing means comprises processing means for cumulatively adding image data within a cell.

20. The apparatus according to claim 17, wherein said totalizing means comprises processing means for making a histogram and processing means for cumulatively adding image data within a cell.

21. The apparatus according to claim 18 or 20, wherein said processing means for making a histogram includes a histogram memory and an incrementer.

22. The apparatus according to claim 19 or 20, wherein said processing means for cumulatively adding image data includes a cumulative chromaticity memory and an adder.

23. The apparatus according to any one of claims 18, 20 and 21, wherein a cell image parameter obtained by said processing means for making a histogram is a chromaticity histogram or gradient histogram.

24. The apparatus according to any one of claims 19, 20 and 22, wherein a cell image parameter obtained by said processing means for cumulatively adding image data is cumulative chromaticity information or cumulative gradient information.

* * * * *

UNITED STATES PATENT AND TRADEMARK OFFICE
CERTIFICATE OF CORRECTION

PATENT NO. : 5,099,521

DATED : March 24, 1992

INVENTOR(S) : Kosaka

It is certified that error appears in the above-identified patent and that said Letters Patent is hereby corrected as shown below:

[57] ABSTRACT, line 1, change "." (period) to --,-- (comma).

Column 2, line 49, change "by" to --be--.

Column 3, line 66, after "processor" insert --board--.

Column 4, line 28, change "if" (first occurrence) to --is--.

Column 4, line 36, change "presert" to --present--.

Column 8, line 7, delete "data" to have the phrase read "image by image pickup means,".

Column 9, line 33, change "explantory" to --explanatory--.

Column 9, line 35, change "method" to --Method--.

Column 11, line 33, after "$b_6$" (first occurrence) insert --$b_5$--.

Column 11, line 67, change "$\mu$per" to --$\mu$s per--.

UNITED STATES PATENT AND TRADEMARK OFFICE
CERTIFICATE OF CORRECTION

PATENT NO. : 5,099,521

DATED : March 24, 1992

INVENTOR(S) : Kosaka

It is certified that error appears in the above-identified patent and that said Letters Patent is hereby corrected as shown below:

IN THE CLAIMS:

Claim 2, Column 16, line 36 change "is" (first occurrence) to --it--.

Signed and Sealed this

Fourteenth Day of September, 1993

Attest:

BRUCE LEHMAN

Attesting Officer

Commissioner of Patents and Trademarks